United States Patent
Karem

(10) Patent No.: US 10,272,997 B1
(45) Date of Patent: Apr. 30, 2019

(54) STRUCTURAL ENCLOSURE FOR AN AIRCRAFT PROPULSION SYSTEM

(76) Inventor: Abe Karem, Tustin, CA (US)

(*) Notice: Subject to any disclaimer, the term of this patent is extended or adjusted under 35 U.S.C. 154(b) by 564 days.

(21) Appl. No.: 12/254,971

(22) Filed: Oct. 21, 2008

Related U.S. Application Data

(60) Provisional application No. 60/981,559, filed on Oct. 22, 2007.

(51) Int. Cl.
*B64C 29/02* (2006.01)
*B64C 29/00* (2006.01)

(52) U.S. Cl.
CPC .............. *B64C 29/00* (2013.01); *B64C 29/02* (2013.01)

(58) Field of Classification Search
USPC .................................................. 244/53 R, 54
See application file for complete search history.

(56) References Cited

U.S. PATENT DOCUMENTS

| | | | |
|---|---|---|---|
| 4,658,579 A | 4/1987 | Bower et al. | |
| 4,998,995 A * | 3/1991 | Blythe | B64D 27/06 244/53 R |
| 5,054,716 A * | 10/1991 | Wilson | B64D 35/00 244/56 |
| 5,096,140 A * | 3/1992 | Dornier, Jr. | B64C 29/0033 244/12.4 |
| 5,390,878 A * | 2/1995 | Padden | B64D 15/02 244/53 R |
| 5,839,691 A * | 11/1998 | Lariviere | B64C 29/0033 244/12.4 |
| 5,906,097 A * | 5/1999 | Hebert | B64C 23/00 244/53 R |
| 6,340,135 B1 * | 1/2002 | Barton | B64D 29/00 244/53 B |
| 6,758,439 B2 * | 7/2004 | Harrison | B64D 27/18 244/123.1 |
| 2007/0221780 A1 * | 9/2007 | Builta | B64C 27/52 244/7 R |

FOREIGN PATENT DOCUMENTS

WO    WO 96/11843    4/1996

* cited by examiner

*Primary Examiner* — Brian M O'Hara
*Assistant Examiner* — Keith L Dixon
(74) *Attorney, Agent, or Firm* — Fish IP Law, LLP

(57) ABSTRACT

Loads from the propeller-gearbox-engine assembly are transferred to an airframe directly, without concentrated internal structure. In preferred embodiments this is accomplished using a lightweight, structurally efficient hub and gearbox that transfer their rotor loads directly to the nacelle OML (Out Mold Line) monocoque. By keeping the load path direct and at the largest diameter, the structure achieves higher stiffness and strength efficiency than conventional point loaded internal frames.

7 Claims, 3 Drawing Sheets

STRUCTURAL ENCLOSURE FOR AN AIRCRAFT PROPULSION SYSTEM

This application claims priority to U.S. provisional application Ser. No. 60/981,559, filed Oct. 22, 2007 which is incorporated by reference herein in its entirety.

FIELD OF THE INVENTION

The field of the invention is aircraft structural design.

BACKGROUND

In the last 80 years, the aircraft industry has made wide use of load bearing skins in what is called monocoque or semi-monocoque construction of both wings and fuselages. In such a construction method, the outside skin of the aircraft is an integral structure that is stabilized against buckling and able to carry the major air loads, bending loads and pressurization loads. Local concentrated loads, such as wing to fuselage attachments, drivetrain to airframe attachments and landing gear attachments, are distributed to the skins through use of bulkheads and other internal structural members.

Propeller driven aircraft traditionally use internal frames and/or pylon structures to carry the load from the gearbox-engine assembly to the wing or the nose of the aircraft. In such cases the powerplant is enclosed by a non-structural cowling that provides the desired external aerodynamic shape and internal air flow. While the non-structural cowling over internal frame construction provides easy access for maintenance, the cowling is heavy as compared to a single load-bearing monocoque.

Vertical Take-Off and Landing (VTOL) aircraft and Short Take-Off and Landing (STOL) aircraft have for many years also used internal frames and/or pylon structures to carry the load from the propeller-gearbox-engine assembly to the fuselage of the aircraft. See, for example, WO 96/11843 to Brodell (publ. April 1996), and U.S. Pat. No. 4,658,579 to Bower et al. (April, 1987). These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

The rotors of a VTOL or STOL aircraft can apply large lift, torque and moment loads to their support structures. This is especially true of a rigid or hingeless rotor. In these demanding VTOL and STOL configurations where weight is a critical factor, traditional pylon and internal frame supports would be structurally inefficient because they would require significant additional material to provide adequate structural stiffness and strength.

Thus, there is still a need for better ways of transferring loads from a propeller-gearbox-engine assembly to the fuselage of an aircraft.

SUMMARY OF THE INVENTION

The present invention provides apparatus, systems and methods in which loads from the propeller-gearbox-engine assembly are transferred to the airframe directly without concentrated internal structure.

In preferred embodiments this is accomplished using a lightweight, structurally efficient hub and gearbox that transfer their rotor loads directly to the nacelle OML (Out Mold Line) monocoque. By keeping the load path direct and at the largest diameter, the structure achieves higher stiffness and strength efficiency than conventional point loaded internal frames.

As used herein, the term "nacelle" refers to a streamlined enclosure for an aircraft gearbox and/or engine, regardless of whether the nacelle is wing mounted or fuselage mounted.

DETAILED DESCRIPTION

Figure 1:
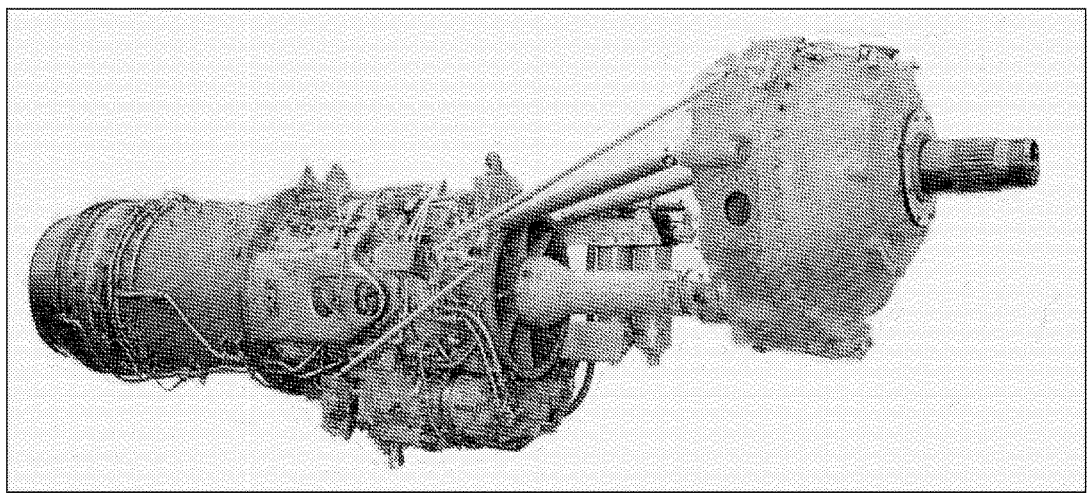
FIG. 1 is a schematic of a prior art T56 engine and gearbox as installed on the C-130 STOL transport aircraft.
Figure 2:
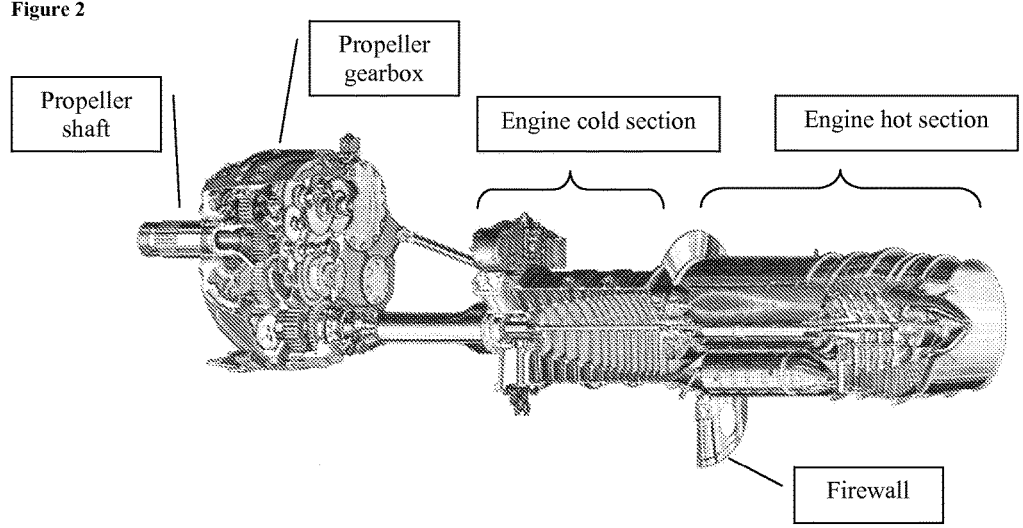
FIG. 2 is a cutout schematic of the prior art engine of FIG. 1.
Figure 3:
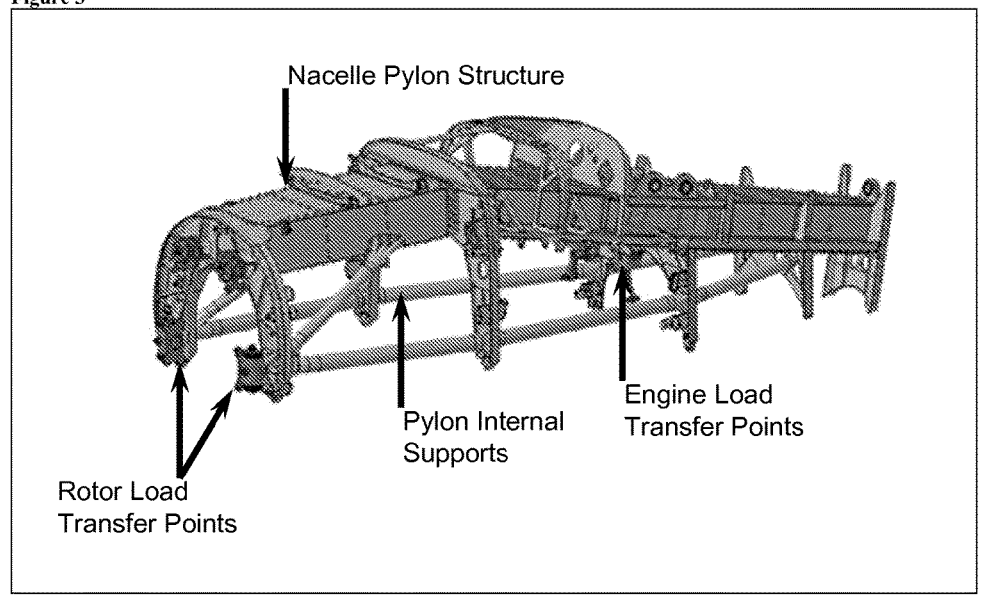
FIG. 3 is a schematic of the prior art pylon structure of the TP400 engine nacelle on the A400M STOL transport aircraft.
Figure 4:
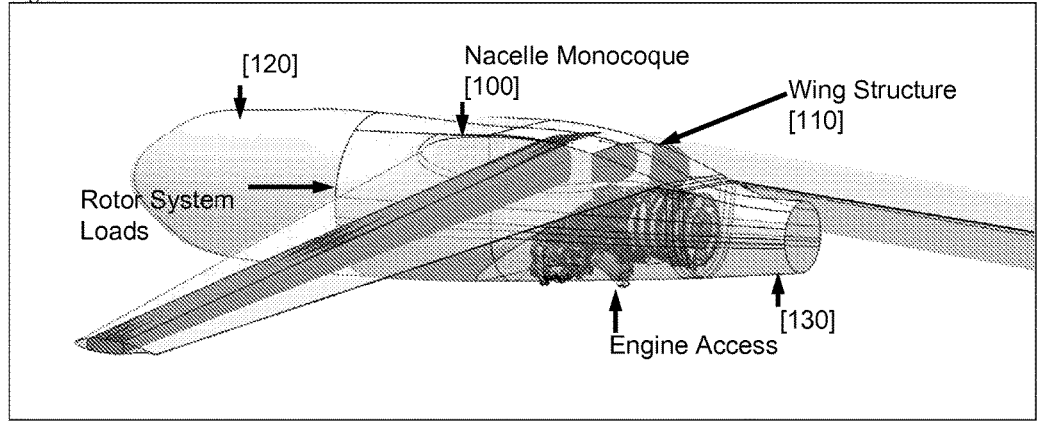
FIG. 4 is a schematic of a preferred nacelle structure as applied to an advanced tilt rotor rotorcraft.

In FIG. 4, the primary structural portion of the nacelle [100], interfaces with the gearbox and rotor system at the spinner diameter and transfers loads to the wing spar [110]. In this embodiment the outboard wing structural spar is used as the tilt axis for the tilt-rotor system. Other nacelle parts (spinner [120] and aft fairing [130]) are non-structural panels.

Figure 5:
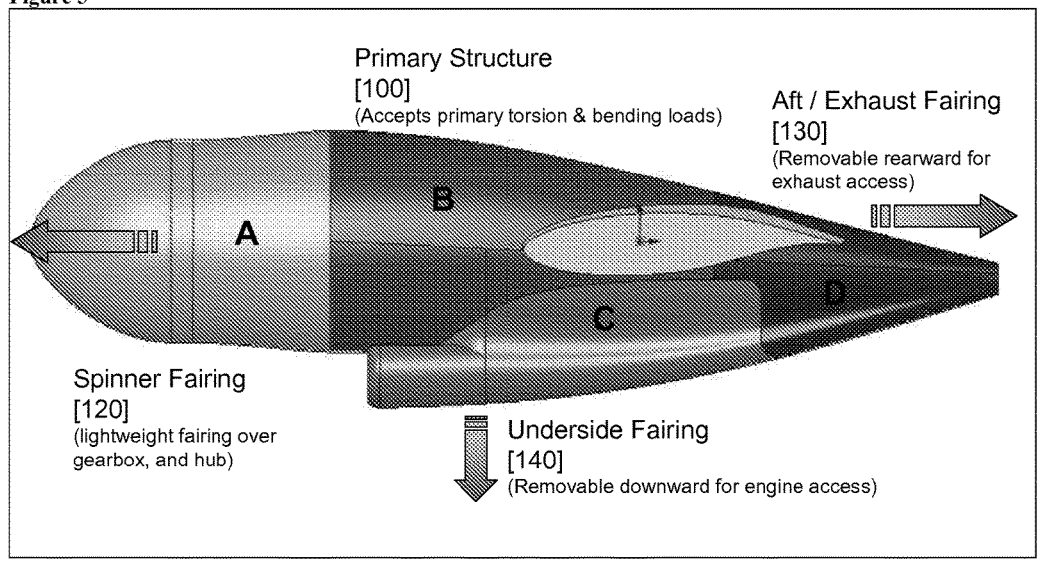
FIG. 5 is a schematic showing structural versus nonstructural parts of an inventive nacelle.

FIG. 5 is a schematic showing structural versus nonstructural parts of an inventive nacelle. Nonstructural panels on the nacelle are divided into three parts; one lower panel to allow full access to remove and service the engine [140]. One aft panel to allow installation and servicing if the exhaust system [130]. One forward spinner to allow access to the rotor hub [120].

Contemplated nacelles, however, are not limited to being divided into three parts, but could have no divisions or any number of suitable divisions. Unless a contrary intent is apparent from the context, all ranges recited herein are inclusive of their endpoints, and open-ended ranges should be interpreted to include only commercially practical values.

All suitable couplings between wing and nacelle are also contemplated. For example, the nacelle be positioned forward or aft of that shown, and could be positioned closer or farther away from the end of the wing.

Especially preferred embodiments have a non-structural cowling around the engine, with a firewall in between the rotor and engine areas. This facilitates access to the engine, where the vast majority of the required powerplant maintenance takes place. In addition, because the propeller (or rotor) gearbox is situated in the "cold" side of the nacelle firewall and the hot section of the engine is situated in the "hot" side of the firewall, embodiments using that design can employ composite structures (carbon fiber reinforced plastics in particular) for the monocoque highly-stressed section of the nacelle, and a lighter titanium nonstructural protective covering in the aft section for better fire resistance and ease of maintenance access. FIGS. 4 and 5 should be interpreted accordingly.

Thus, specific embodiments and applications of stressed nacelle structures have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of reducing weight in a vertical takeoff and landing aircraft having a fuselage and a propulsion system with a non-gimballed, hingeless rotor providing lift and generating rotor load moment, a gearbox driving the rotor, and an engine, comprising:

providing a lightweight, structurally efficient monocoque nacelle around the gearbox and the engine;

providing a non-structural spinner fairing having a diameter that rotates with the rotor and that covers a hub of the rotor; and transferring rotor thrust and rotor load moment loads from the rotor to a wing or fuselage of the aircraft through the nacelle at the diameter of the spinner fairing.

2. The method of claim 1, further comprising employing a composite in a highly stressed portion of the monocoque nacelle that transfers at least a portion of the rotor thrust and rotor load moment loads.

3. The method of claim 2, further comprising employing carbon fiber reinforced plastic in the composite.

4. The method of claim 3, further comprising providing a non-structural cowling around the engine.

5. The method of claim 4, further comprising employing titanium in the cowling.

6. The method of claim 4, further comprising providing a firewall between cold and hot portions of the engine.

7. The method of claim 1, further comprising generating a yaw control moment.

* * * * *